U S 0 1 1 7 4 7 6 1 3 B 2

US011747613B2

(12) United States Patent
Knotts et al.

(10) Patent No.: US 11,747,613 B2
(45) Date of Patent: Sep. 5, 2023

(54) MULTI-AXIS ACTUATOR WITH DIFFERENTIAL DRIVE

(71) Applicant: BAE Systems Information and Electronic Systems Integration Inc., Nashua, NH (US)

(72) Inventors: Michael E. Knotts, Milford, NH (US); Adam J. Marcinuk, Lyndeborough, NH (US); Chris L. Willis, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 471 days.

(21) Appl. No.: 17/090,317

(22) Filed: Nov. 5, 2020

(65) Prior Publication Data

US 2022/0137401 A1    May 5, 2022

(51) Int. Cl.
| | |
|---|---|
| G02B 26/08 | (2006.01) |
| G02B 26/10 | (2006.01) |
| G02B 7/182 | (2021.01) |
| F16H 48/00 | (2012.01) |
| F16M 11/00 | (2006.01) |

(52) U.S. Cl.
CPC .......... *G02B 26/105* (2013.01); *F16H 48/00* (2013.01); *F16M 11/00* (2013.01); *G02B 7/1821* (2013.01)

(58) Field of Classification Search
CPC .. G02B 26/105; G02B 7/1821; G02B 26/101; F16H 48/00; F16M 11/00
See application file for complete search history.

(56) References Cited

U.S. PATENT DOCUMENTS

2009/0312870 A1* 12/2009 Okuda ................. F16H 1/16
700/258
2020/0298971 A1* 9/2020 Bouabdallah ........... B64C 11/44

OTHER PUBLICATIONS

Mills, Allan, "Heliostats Siderostats and Coelostats—a Review of Practical Instruments for Astronomical Applications", The Journal of the British Astronomical Association, Mar. 1985, 12 pages.

* cited by examiner

*Primary Examiner* — Euncha P Cherry
(74) *Attorney, Agent, or Firm* — Finch & Maloney PLLC; Gary McFaline

(57) ABSTRACT

A multi-axis rotary actuator includes a payload support configured to be rotatable about a first axis, a disk surrounding at least a portion of the payload support, and an elevation wheel rotatably coupled to the payload support. The disk is configured to be rotatable about the first axis. The elevation wheel is configured to be in contact with the disk and to be rotatable about a second axis perpendicular to the first axis. The actuator can include a mirror or other device coupled to the elevation wheel. The mirror or other device is configured to be rotatable about the first axis and the second axis as the payload support and the elevation wheel rotate about the first axis and the second axis, respectively.

8 Claims, 9 Drawing Sheets

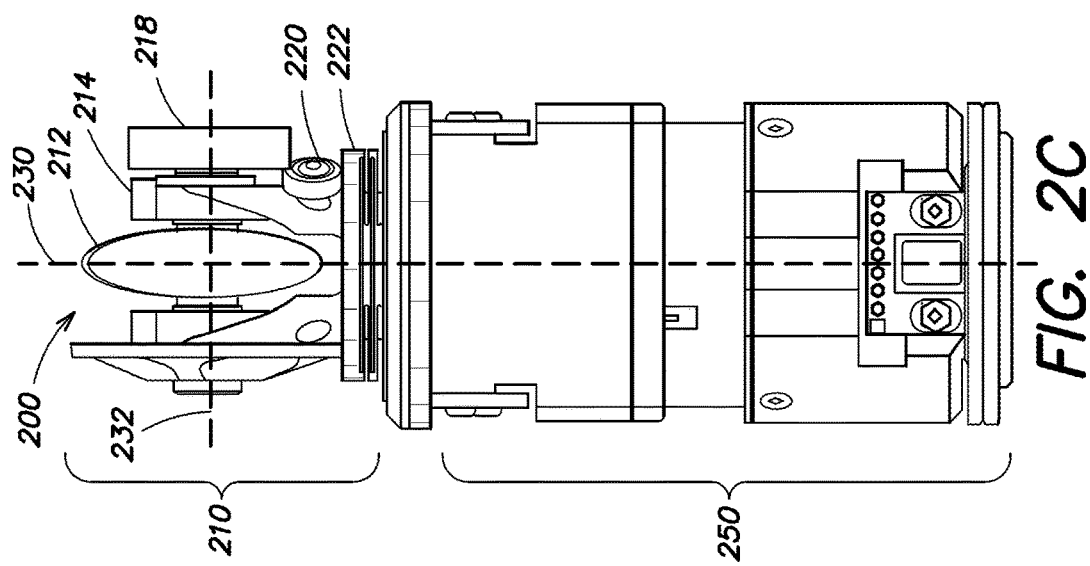
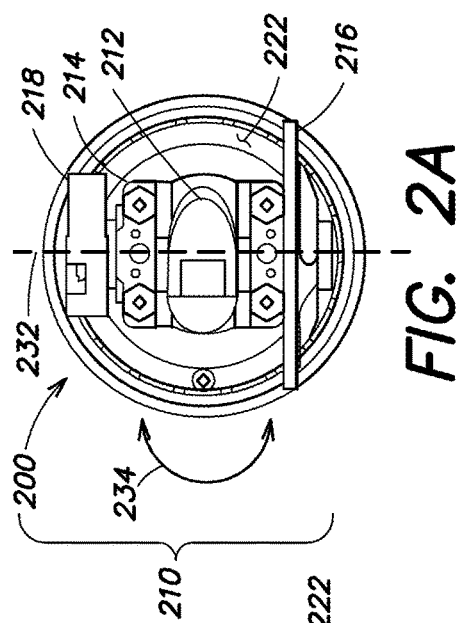
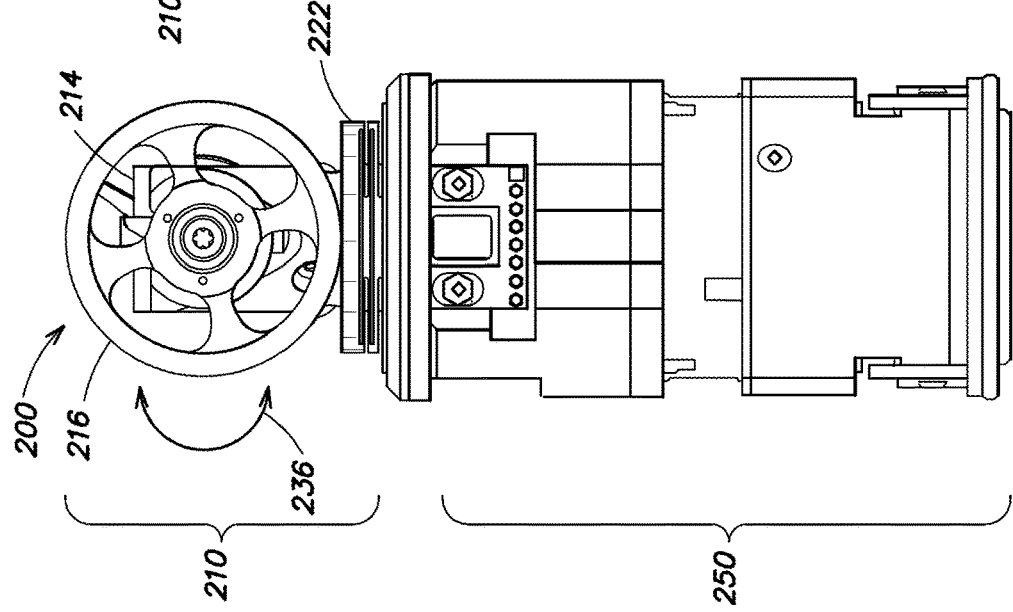

MULTI-AXIS ACTUATOR WITH DIFFERENTIAL DRIVE

STATEMENT OF GOVERNMENT INTEREST

This invention was made with United States government assistance. The United States government has certain rights in the invention.

FIELD OF THE DISCLOSURE

This disclosure relates generally to multi-axis actuators and more particularly, to a rotary actuator with a differential drive that provides two or more degrees of freedom.

BACKGROUND

Multi-axis actuators can be used for positioning various types of devices, such as antennas, sensors, and lasers, relative to a fixture or other structure. Typically, movement of the device along each axis, or degree of freedom, is separately controlled by a different actuator. For example, a first actuator is attached to the fixture for controlling the azimuth of the device relative to the fixture, and a second actuator can be configured to control elevation of the device relative to the fixture. To achieve this, the second actuator is typically mounted on the mechanism that is controlled by the first actuator. Such an arrangement causes the second actuator to rotate along with the device when the first actuator changes the azimuth, and therefore the first actuator must have enough torque to move both the device and the second actuator. Additionally, such an arrangement requires slip rings or flexible couplings to complete electrical connections between the fixture and the movable portion of the device. Slip rings increase rotational friction in the mechanism and flexible coupling act as torsion springs. Flexible couplings limit the angular range of rotation which is detrimental to some applications. Both of these effects may complicate control system design. These requirements increase the cost, complexity, and mass of the device, which can limit its applications. Therefore, there are non-trivial issues associated with existing actuator designs, including the use of such actuators in a small form factor or where size and weight are limited by design considerations.

BRIEF DESCRIPTION OF THE DRAWINGS

FIG. 2A is a top-down view of another example multi-axis rotary actuator, in accordance with an embodiment of the present disclosure.

FIGS. 2B and 2C are different side views of the actuator of FIG. 2A, in accordance with an embodiment of the present disclosure.

DETAILED DESCRIPTION

Figure 1A:
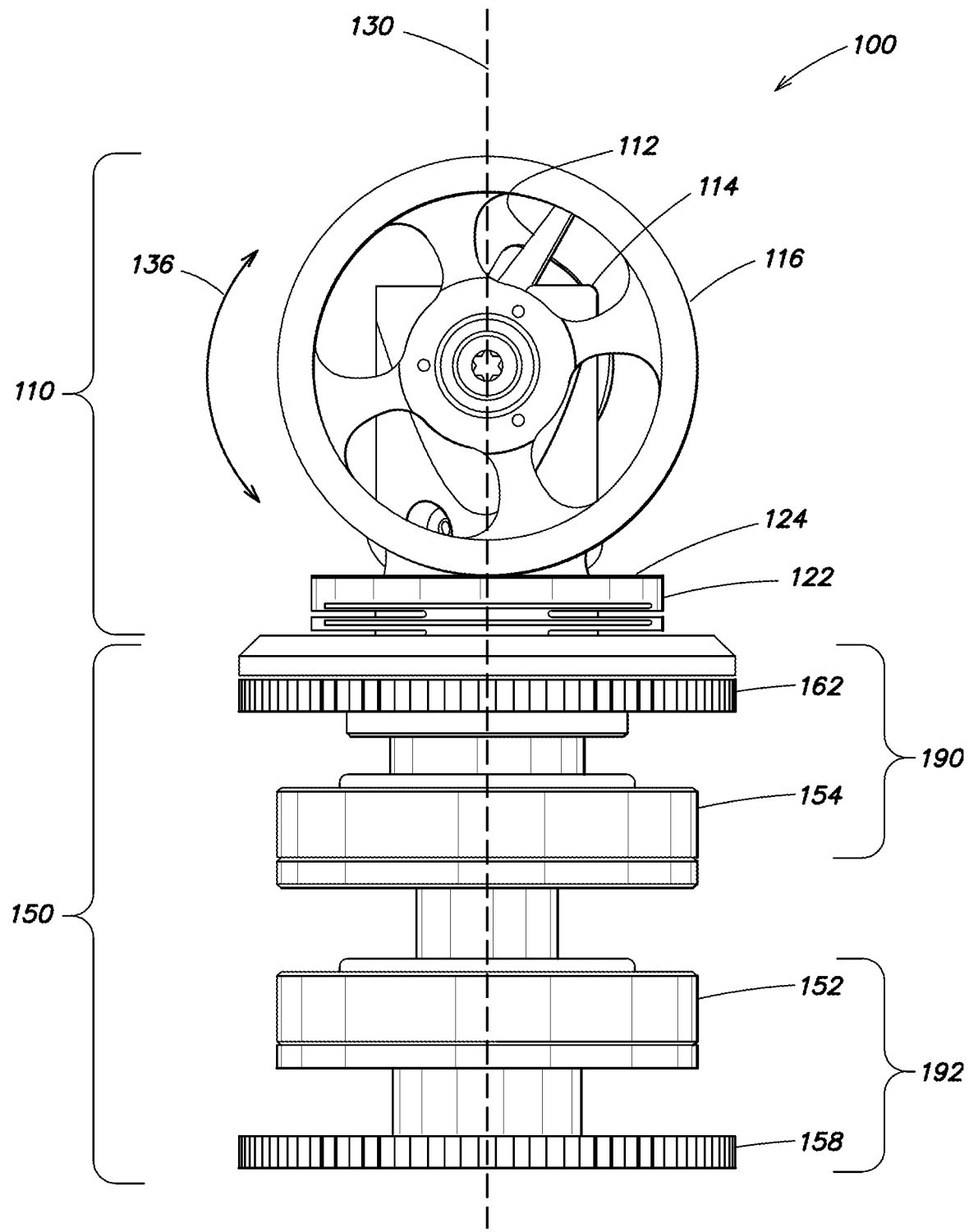
FIG. 1A is a side view of an example multi-axis rotary actuator, in accordance with an embodiment of the present disclosure.

Techniques are disclosed for a rotary actuator with a differential drive that provides two or more degrees of freedom. In accordance with an embodiment of the present disclosure, a multi-axis rotary actuator includes a payload support configured to be rotatable about a first axis, a disk surrounding at least a portion of the payload support, and an elevation wheel rotatably coupled to the payload support. The term payload support is used to describe the structure to which payload bearings are attached, regardless of the geometry of the payload. In some embodiments, the payload is a mirror, and the payload support is a yoke or fork-like structure that supports an output mirror trunnion from bearings placed on opposite sides of the mirror. In other embodiments, the mirror is cantilevered from a bearing arrangement on one side of the mirror. The disk is configured to be rotatable about the first axis. The elevation wheel is configured to be in contact with the disk and to be rotatable about a second axis perpendicular to the first axis. In some embodiments, the actuator includes a mirror or other device coupled to the elevation wheel. The mirror or other device is configured to be rotatable about the first axis and the second axis as the payload support and the elevation wheel rotate about the first axis and the second axis, respectively. Numerous variations will be apparent in light of this disclosure.

General Overview

As noted above, there is a need for miniature torque rotary actuator mechanisms with two or more degrees of freedom capable of maximizing interior payload volume, providing integral angle feedback with high precision, and permitting continuous rotation. Existing designs are at least an order of magnitude too large for such applications and cannot be easily scaled down due to fundamental challenges associated with the need to pass many electrical signals through one or more rotating joints and the miniaturization of torque motors and angle encoders. For instance, the hysteresis observed with conventional right-angle gear mechanisms due to backlash prohibits their use in very high precision applications. Anti-backlash gears are challenging for compact designs and result in high friction and wear.

To this end, mechanical devices for repeatably and precisely controlling angular rotations of a payload about two orthogonal axes are disclosed. Some example embodiments can be used in applications such as high precision laser beam pointing or the steering and stabilization of high magnification imagery from small, unmanned platforms. In some examples, the disclosed techniques are useful for applications that do not require the payload to be connected to the non-rotating exterior by components such as wires or tubes. For instance, in some examples the payload includes a mirror for azimuth and elevation pointing of an optical beam or for controlling the line of sight of an imaging system. However, it will be understood that the payload can include any self-contained device, such as a sensor, a camera, a laser, an optical pointer, or other devices that do not require a moving mechanical connection for signals or power. Examples of such devices include optical pointers, which are similar to Risley prisms. Risley prisms are refractive prisms arranged so that they can rotate about an un-deviated optical axis while a line representing the vertex of the acute angle between their input and output faces remains perpendicular to the rotation axis. In contrast, embodiments of the present disclosure provide optical pointers that are less massive and have a larger angular field of regard than a conventional Risley prism.

In further detail, an embodiment of the present disclosure provides a multi-axis rotary actuator, which includes several components that are centered about a common, central axis of the actuator and constrained to rotate only about the common axis relative to a fixed structure. The components include a top assembly and a base assembly, each having a torque motor and an encoder scale for positioning the assembly relative to a common mounting frame. The base assembly includes three parts rigidly connected to each other and a payload support assembly: a payload support encoder scale, a payload support torque motor, and a central cylindrical tube. The top assembly includes a road encoder scale, a road torque motor, and a road structure. The road structure includes a precisely machined (flat) road surface supported by an integral flexure spring that allows compression along the common axis but prevents torsional deviation about the axis between the top road surface and the bottom of the road structure. The payload support assembly includes a mirror trunnion supported by a pair of small precision bearings mounted in the payload support so that the rotation axes of the mirror and the payload support are co-linear and perpendicular to the common axis. An elevation wheel is attached to one end of the mirror trunnion, and a counterweight balances both the trunnion about its axis of rotation and the entire payload support structure about the common axis. The elevation wheel, and thus the mirror trunnion, rolls with respect to the road surface while the flexure spring in the road structure maintains a fixed preload force at the contact point between the elevation wheel and the road surface. Two idler wheels are included in the payload support assembly. The two idler wheels stabilize the plane of the road surface so that it remains perpendicular to the central axis. The mechanism operates as a differential drive since the rotation of the output mirror about the elevation axis is proportional to the difference between the rotation angle of each torque motor about their common axis. Rotation of the output mirror about the common axis is equal to that of the payload support torque motor. The common axis is referred to as the azimuth axis. The terms azimuth and elevation only represent spherical coordinates and are not assumed to have any specific meaning in a specific context (for example navigation or astronomy).

In some embodiments, the actuator includes an exterior structure that rigidly links the stators for the two torque motors, the sensors for both angle encoders, and the exterior of the bearings used to constrain the motion of the top and base assemblies. Further examples are described below with respect to the drawings.

Multi-Axis Rotary Actuator with Open Bore Torque Motors

Figure 1B:
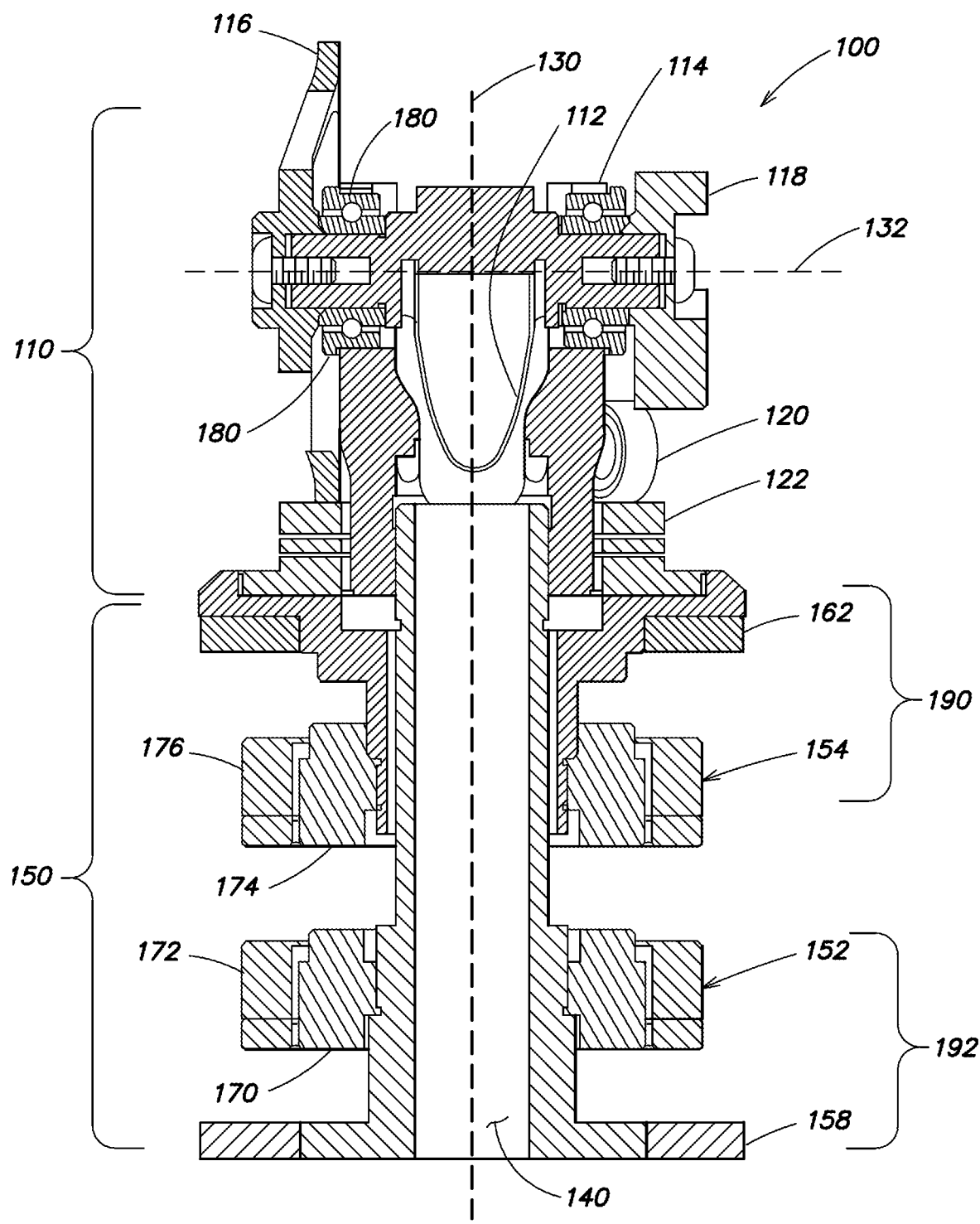
FIG. 1B is a cross-sectional side view of the actuator of FIG. 1A, in accordance with an embodiment of the present disclosure.
Figure 1C:
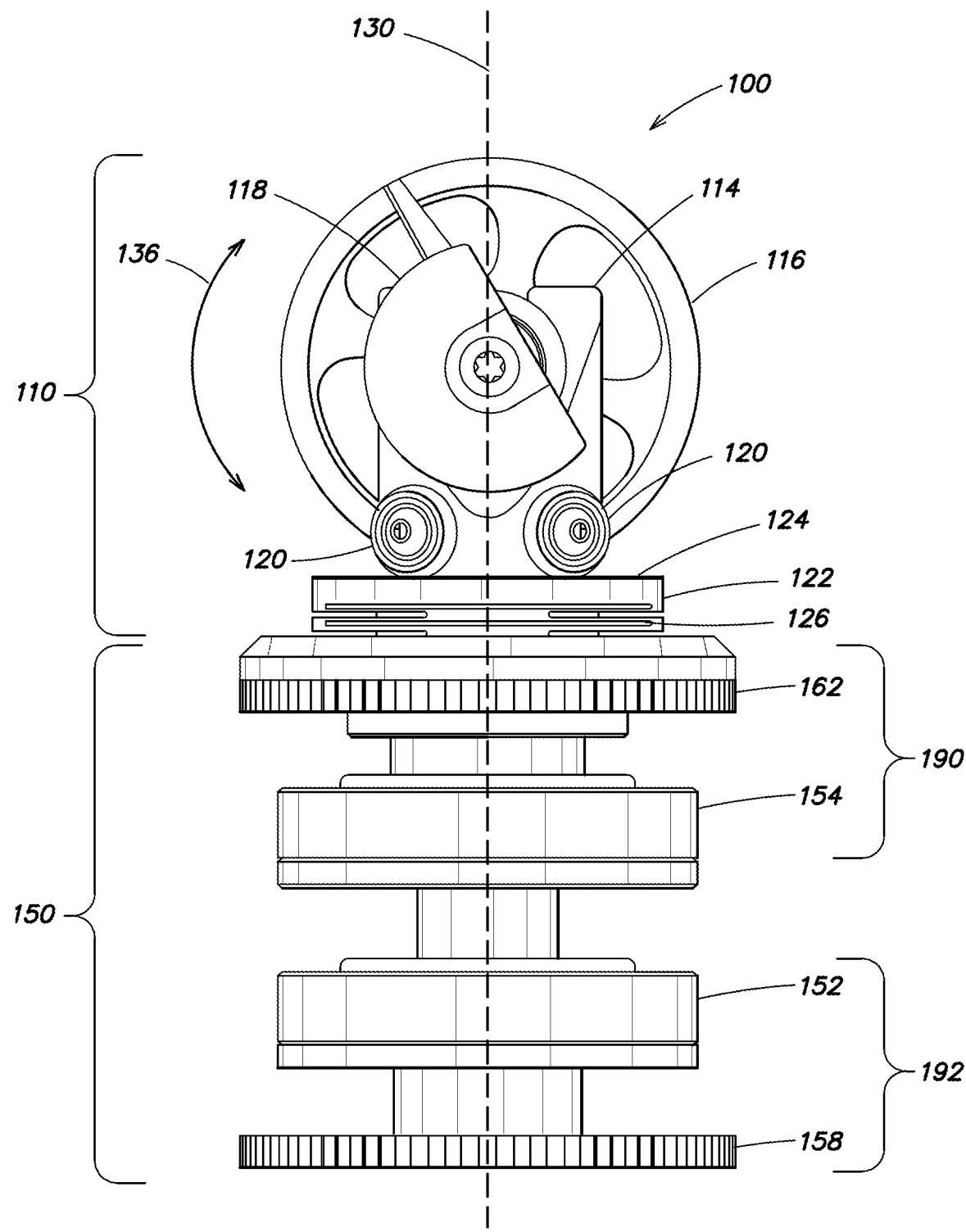
FIG. 1C is another side view of the actuator of FIG. 1A, in accordance with an embodiment of the present disclosure.
Figure 1D:
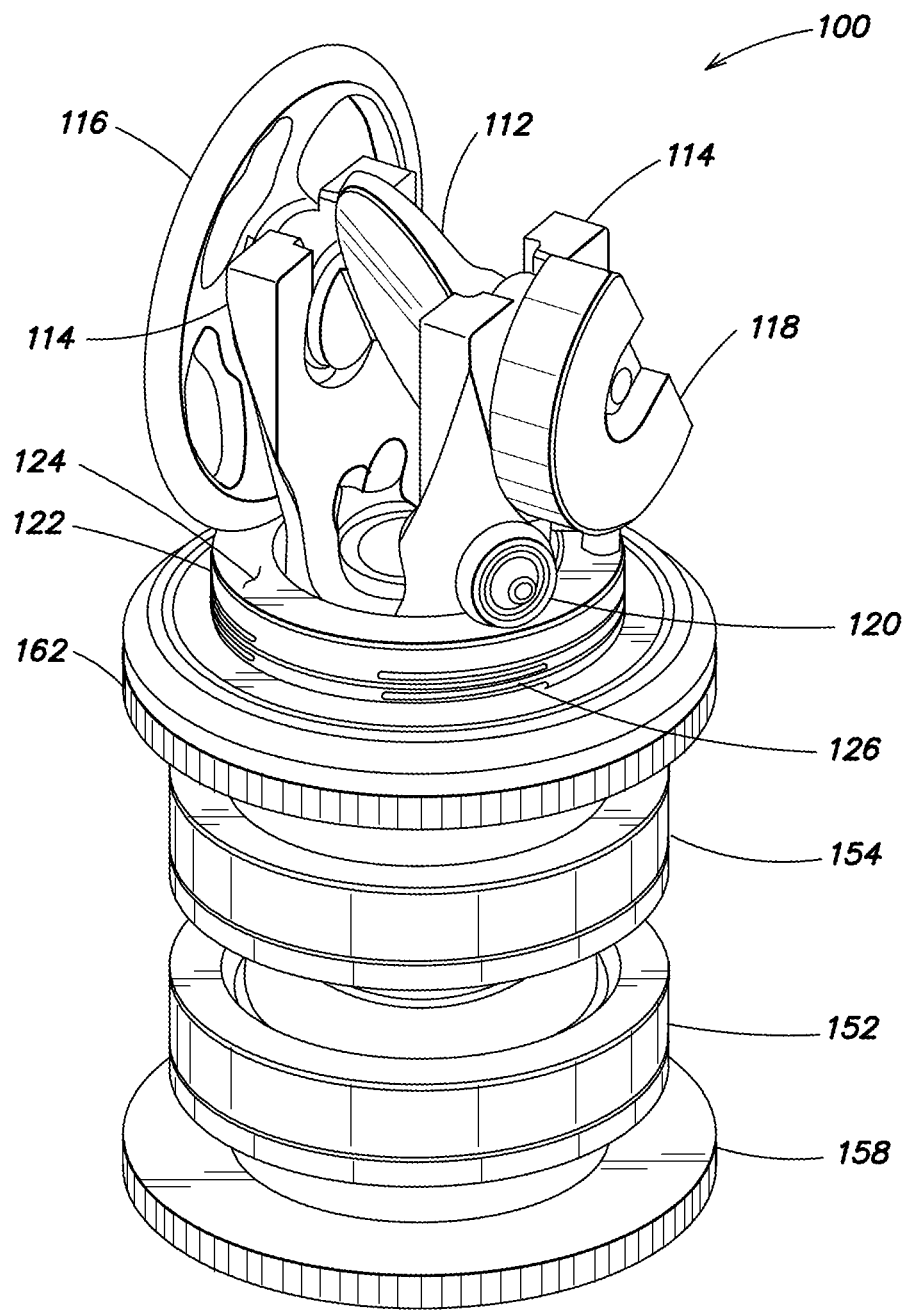
FIG. 1D is a perspective view of the actuator of FIG. 1A, in accordance with an embodiment of the present disclosure.

FIGS. 1A-D show an example multi-axis rotary actuator 100, in accordance with an embodiment of the present disclosure. FIG. 1A is a side view of the actuator 100. FIG. 1B is a cross-sectional side view of the actuator 100. FIG. 1C is another side view of the actuator 100. FIG. 1D is a perspective view of the actuator 100.

The actuator 100 includes a top assembly 110 and a base assembly 150. The top assembly 110 and base assembly 150 are concentric about a common, or azimuth, axis 130. The top assembly 110 includes a yoke 114, a disk 122, and an elevation wheel 116. The yoke 114 is a payload support configured to be rotatable about a first axis 130 that passes through both the top assembly 110 and the base assembly 150. The disk 122 surrounds at least a portion of the yoke 114 and is configured to be rotatable about the first axis 130. The disk 122 rotates independently of the yoke 114. An upper surface of the disk 122 is referred to as a road 124. The elevation wheel 116 is connected to the yoke 114 and rotates about two axes. The elevation wheel 116 rotates about a second axis 132, which is fixed with respect to the yoke 114. The elevation wheel rotates about the first axis 130 along with the yoke 114. The second axis 132 intersects the first axis 130 and the two axes 130, 132 are perpendicular, but other arrangements are possible. The elevation wheel 116 is configured to be in contact with the road 124 of the disk 122. In some embodiments, the elevation wheel 116 includes a ceramic material, anodized aluminum, and/or stainless steel, although it will be appreciated that any suitable material can be used. For example, the elevation wheel 116 can include rubber, plastic (e.g., ultra-high molecular weight (UHMW) polyethylene), foam, coated abrasives, or other materials that are suitable for the environmental conditions (e.g., temperature) under which the actuator 100 is designed to be operated. In some embodiments, one or more elevation bearings 180 are located between the elevation wheel 116 and the yoke 114 to facilitate rotation of the elevation wheel 116 about the second axis 132.

In some embodiments, the top assembly 110 includes a payload 112 coupled or mounted to the elevation wheel 116. As noted above, it will be understood that the payload 112 can include any self-contained device, such as a mirror, sensor, a camera, a laser, an optical pointer, or other devices that do not require a moving mechanical connection for signals or power The payload 112 is configured to be rotatable about the first axis 130 and the second axis 132 as the yoke 114 and the elevation wheel 116 each rotate about the first axis 130 and the second axis 132, respectively. For example, referring to FIGS. 1A-C, the elevation wheel 116 rotates about the second axis 132, as indicated at 136 (in FIGS. 1A and 1C, the second axis 132 extends outward from the drawing plane).

In some embodiments, the base assembly 150 includes a road drive assembly 190 and a yoke drive assembly 192. The road drive assembly 190 includes a road torque motor 154 and a road angle encoder scale 162. The road torque motor 154 is coupled to the disk 122 and is configured to rotate the disk 122 and the road 124 about the first axis 130. The stator of the road torque motor 154 (not shown) is rigidly attached to a mechanical structure generally represented as the base assembly 150. The road angle encoder scale 162 is attached to the disk 122 and thus rotates with the disk 122 and the road 124. The yoke drive assembly 192 includes a yoke torque motor 152 and a yoke angle encoder scale 158. The yoke torque motor 152 is coupled to the yoke 114 and is configured to rotate the yoke 114 about the first axis 130. The yoke angle encoder scale 158 is attached to the yoke 114 and thus rotates with the yoke 114. The stator of the yoke torque motor 152 is rigidly attached to the same mechanical structure generally represented by the base assembly 150 as the stator of the road torque motor 154. The mechanical structure can include, for example, a housing.

In some embodiments, the road drive assembly 190 further includes a road angle encoder sensor (not shown for clarity), which senses the position of the road 124 via the road angle encoder scale 162. The road angle encoder sensor is configured to provide position information to the road torque motor 154. The yoke drive assembly 192 further includes a yoke angle encoder sensor (not shown for clarity), which senses the position of the yoke 114 via the yoke angle encoder scale 158. The yoke angle encoder sensor is configured to provide position information to the yoke torque motor 152. The yoke angle encoder sensor and the road angle encoder sensor are both fixedly attached to the base assembly 150. In some embodiments, the road angle sensor and the yoke angle sensor are rigidly attached to the same mechanical structure generally represented by the base assembly 150 as the road torque motor stator and the yoke torque motor stator.

In further detail, the yoke angle encoder sensor is configured to detect the position of the yoke angle encoder scale 158, which represents the rotational position of the yoke 114 with respect to the base assembly 150. The detected position of the yoke angle encoder scale 158 is used control the yoke torque motor 152 for precisely positioning the yoke 114, thus controlling the azimuth and/or the elevation of the payload 112. The road angle encoder sensor is configured to detect the position of the road angle encoder scale 162, which represents the rotational position of the disk 122 with respect to the base assembly 150. The detected position of the road angle encoder scale 162 is used control the road torque motor 154 for precisely positioning the disk 122, thus controlling the elevation of the payload 112 with respect to the base assembly 150. Note that rotation of the disk 122 has no effect on azimuth, which is a function of the rotational position of the yoke 114.

In some embodiments, the yoke torque motor 152 includes a yoke torque motor rotor 170 and a yoke torque motor stator 172, where the rotor 170 is connected to the yoke 114 and the stator 172 is connected to the base assembly 150. The road torque motor 154 includes a road torque motor rotor 174 and a road torque motor stator 176, where the rotor 174 is connected to the disk 122 and the stator 176 is connected to the base assembly 150.

In some embodiments, the payload 112 can be a mirror, and the yoke torque motor 152 and the road torque motor 154 are open-bore motors, which permit an axial bore 140, or yoke tube, to extend entirely through the base assembly 150 along the first axis 130 and through an opening of the disk 122. The axial bore 140 permits light, such as from a laser or other light source, to enter at the bottom of the base assembly 150 and travel up to the payload 112 (such as a mirror) uninterrupted while the yoke 114 and the disk 122 are in any rotational position and, correspondingly, while the payload 112 (such as a mirror) is positioned at any azimuth or elevation.

As described above, the elevation wheel 116 is configured to be in contact with the road 124 of the disk 134. Thus, in operation, rotation of the disk 122 about the first axis 130 causes rotation of the elevation wheel 116. For instance, as the disk 122 rotates clockwise, the elevation wheel 116 rotates counterclockwise, and vice versa. In some embodiments, the payload 112 is coupled to the elevation wheel 116. Thus, in operation of such embodiments, as the elevation wheel 116 rotates counterclockwise, the payload 112 rotates counterclockwise about the second axis 132. Furthermore, in operation, as the yoke 114 rotates about the first axis 130, the elevation wheel 116 and the payload 112 rotate about the first axis 130. In this configuration, the payload 112 has at least two degrees of freedom: (i) azimuth from rotation about the first axis 130 and (ii) elevation from rotation about the second axis 132, both with respect to the base assembly 150. Recall that the second axis 132 rotates about the first axis 130 with the yoke 114.

Azimuth and elevation of the payload 112 are controlled independently and/or in combination as follows:

Azimuth changes and elevation remains constant by rotating the yoke 114 and the disk 122 about the first axis 130 by the same amount of displacement (e.g., rotate the yoke 114 and the disk 122 by 20 degrees counterclockwise). In this manner, the elevation wheel 116 incurs no rotational displacement with respect to the yoke 114, keeping the elevation of the payload 112 constant as the azimuth changes.

Azimuth and elevation both change by rotating the yoke 114 and the disk 122 about the first axis 130 by different amounts of displacement (e.g., rotate the yoke 114 by 20 degrees counterclockwise and rotate the disk 122 by 10 degrees counterclockwise).

Elevation changes and azimuth remains constant by rotating only the disk 122 about the first axis 130. In this manner, the yoke 114 incurs no rotational displacement while the elevation wheel 116 rotates with the disk 122, keeping the azimuth of the payload 112 constant as the elevation changes.

Put in mathematical terms, with the yoke 114 fixed ($\Delta\gamma=0$), rotation of the disk 122 causes a normal vector extending from the payload 112 (such as a mirror surface) to rotate in elevation only: $\Delta\varepsilon=\Delta\theta \cdot r_r/r_w$ and $\Delta\alpha=0$, where $\Delta\varepsilon$ is the angular displacement of the elevation wheel 116 about the second axis 132, $\Delta\theta$ is the angular displacement of the disk 122, and $\Delta\alpha$ is the angular displacement of the payload 112 about the first axis 130. In the common mode case where the yoke 114 and the disk 122 are rotated by the same angle ($\Delta\gamma=\Delta\theta$), the payload surface normal vector rotates only in the azimuthal direction: $\Delta\varepsilon=0$ and $\Delta\alpha=\Delta\gamma$. In the differential mode case where the yoke 114 and the disk 122 both rotate but by different angles, the payload surface normal rotates in both azimuth and elevation as a function of the differential angular rotations of the payload support and the disk: $\Delta\alpha=\Delta\gamma$ and $\Delta\varepsilon=r_r \cdot (\Delta\gamma-\Delta\theta)/r_w$.

In the equations above, $r_r$ is the radius about the first axis 130 at which the elevation wheel 116 contacts the road 124 and $r_w$ is the radius of the elevation wheel 116 itself. A practical system will typically rotate the yoke 114 and the disk 122 with closed loop electronic control systems that employ feedback from angle-resolving sensors (e.g., encoders) to determine the appropriate current waveforms for the torque motors. If the angular positioning uncertainties for the yoke 114 and the road 124 are $\sigma_\gamma$ and $\sigma_\theta$, respectively, then the uncertainties of the azimuth and elevation angles of the normal vector from a payload is $\sigma_\alpha=\sigma_\gamma$ and $$\sigma_\varepsilon = \frac{r_r}{r_w}\sqrt{\sigma_\gamma^2 + \sigma_\theta^2},$$

respectively. In the case where the control system angular uncertainties are equal ($\sigma_\theta=\sigma_\gamma$) and the ratio of the wheel and road radii is $$\frac{r_w}{r_r} = \sqrt{2},$$

then $\sigma_\alpha=\sigma_\varepsilon=\sigma_\gamma=\sigma_\theta$.

As long as the elevation wheel 116 does not slip as it rolls on the road 124, the angular orientation of the payload 112 is precisely determined by the rotation of the road 124 and the yoke 114, both of which are directly sensed by angle encoders in the road drive assembly 190 and the yoke drive assembly 192. To assure the lack of slippage, the preload force applied by the road 124 (maintained by the flexure spring 126) is sufficient to maintain enough frictional torque to exceed the maximum torque that is applied by motion of the motors during acceleration of the assembly. Various material choices and tribology can be implemented. For example, the elevation wheel 116 can be equipped with a tire (for example, a rubber O-ring) capable of maintaining high friction when operated within certain temperature ranges. In another example, 440C alloy stainless steel (as annealed) can be used for the road 124 and hard anodized aluminum alloy 6061-T6 provides a high friction contact that eliminates undesired slippage.

In some embodiments, the top assembly 110 includes at least one idler wheel 120 coupled to the yoke 114 and configured to be in contact with the road 124. For example, in some embodiments two idler wheels 120 are each located on the yoke 114 opposite the elevation wheel 116. The idler wheel(s) 120 passively ride on the road 124, which provides stability to the elevation wheel 116 for maintaining constant contact with the road 124 during motion.

In some embodiments, a spring is used to maintain contact between the elevation wheel 116 and the road 124 as well as any idler wheels 120 that are present. The spring provides a force between the wheel 116 and the road 124 that is large enough to prevent slippage between the wheel 116 and the road 124 at the point of contact.

In some embodiments, the disk 122 includes an integral flexure spring 126 configured to bias the disk against the elevation wheel 116 and any idler wheels 120 that are present. In some examples, the integral flexure spring 126 has a high torsional stiffness to prevent or limit twisting of the disk 122 relative to the drive motor, such as described below.

In some embodiments, the top assembly 110 includes a counterweight 118 coupled to the yoke/payload support 114 opposite the elevation wheel 116 or to the elevation wheel 116. The counterweight 118 provides stability to the top assembly 110 during motion of various components, such as the yoke 114, the elevation wheel 116, and the payload 112. In one example, the counterweight 118 can be configured to balance the moving components of the elevation assembly, including the counterweight 118, the elevation wheel 116, the payload 112, and bearing components that rotate with the elevation wheel 116 so that the center of mass of the elevation assembly coincides with the second axis 132. In another example, the counterweight 118 can be configured to balance the components that rotate about the first axis 130 including the combination of all moving parts for both the elevation and yoke assemblies so that the center of mass of the components coincides with the first axis 130. The counterweight 118 can be configured to simultaneously achieve both balance conditions described in the previous two sentences. In this configuration, linear accelerations applied via the base assembly 150 will not result in potentially undesirable torques to the payload (such as a mirror).

Figure 2D:
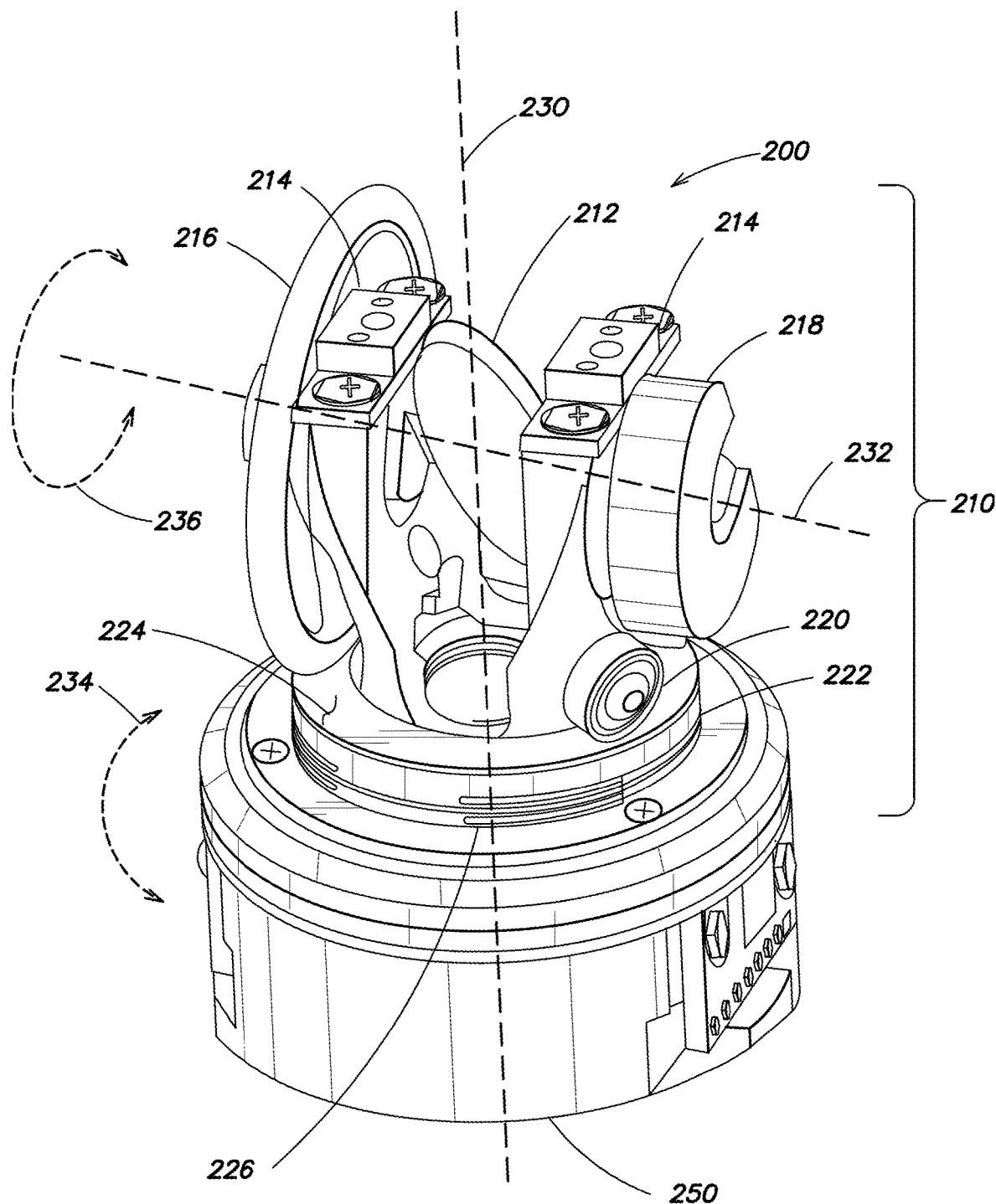
FIG. 2D is a perspective view of a portion of the actuator of FIG. 2A, in accordance with an embodiment of the present disclosure.

Multi-axis Rotary Actuator with Open Bore Torque Motors, Spindle Bearings, and Preload Springs FIGS. 2A-D show another example multi-axis rotary actuator 200, in accordance with an embodiment of the present disclosure. FIG. 2A is a top-down view of the actuator 200. FIGS. 2B and 2C are different side views of the actuator 200. FIG. 2D is a perspective view of a portion of the actuator 200.

The actuator 200 includes a top assembly 210 and a base assembly 250. The top assembly 210 includes a yoke 214, a disk 222, and an elevation wheel 216. The yoke 214 is configured to be rotatable about a first axis 230 that passes through both the top assembly 210 and the base assembly 250. The disk 222 surrounds at least a portion of the yoke 214 and is configured to be rotatable about the first axis 230. The disk 222 rotates independently of the yoke 214. An upper surface of the disk 222 is referred to as a road 224. The elevation wheel 216 is rotatably coupled to the yoke 214 about a second axis 232, which is perpendicular to the first axis 230. The second axis 232, along with the elevation wheel 216, rotates about the first axis 230 with the yoke 214. The elevation wheel 216 is configured to be in contact with the road 224 of the disk 222. In some embodiments, the elevation wheel 216 includes a ceramic material, anodized aluminum, and/or stainless steel, although it will be appreciated that any suitable material can be used. For example, the elevation wheel 216 can include rubber, plastic (e.g., ultra-high molecular weight (UHMW) polyethylene), foam, coated abrasives, or other materials that are suitable for the environmental conditions (e.g., temperature) under which the actuator 200 is designed to be operated.

In some embodiments, the top assembly 210 includes a payload 212, such as described with respect to FIG. 1A-D, coupled or mounted to the elevation wheel 216. The payload 212 is configured to be rotatable about the first axis 230 and the second axis 232 as the yoke 214 and the elevation wheel 216 each rotate about the first axis 230 and the second axis 232, respectively. For example, referring to FIGS. 2A-C, the elevation wheel 216 rotates about the second axis 232, as indicated at 236 (in FIG. 2B, the second axis 232 extends outward from the drawing plane). In a further example, referring to FIG. 2D, the disk 222 rotates about the first axis 230, as indicated at 234.

As described above, the elevation wheel 216 is configured to be in contact with the road 224 of the disk 234. Thus, in operation, rotation of the disk 222 about the first axis 230 causes rotation of the elevation wheel 216. For instance, as the disk 222 rotates clockwise, the elevation wheel 216 rotates counterclockwise, and vice versa. In some embodiments, the payload 212 is coupled to the elevation wheel 216. Thus, in operation of such embodiments, as the elevation wheel 216 rotates counterclockwise, the payload 212 rotates counterclockwise about the second axis 232. Furthermore, in operation, as the yoke 214 rotates about the first axis 230, the elevation wheel 216 and the payload 212 rotate about the first axis 230. In this configuration, the payload 212 has at least two degrees of freedom: (i) azimuth 234 from rotation about the first axis 230 and (ii) elevation 236 from rotation about the second axis 232, both with respect to the base assembly 250. Recall that the second axis 232 rotates about the first axis 230 with the yoke 214.

Azimuth and elevation of the payload 212 are controlled independently and/or in combination as follows:

Azimuth changes and elevation remains constant by rotating the yoke 214 and the disk 222 about the first axis 230 by the same amount (e.g., rotate the yoke 214 and the disk 222 by 20 degrees counterclockwise). In this manner, the elevation wheel 216 incurs no rotational displacement with respect to the yoke 214, keeping the elevation of the payload 212 constant as the azimuth changes.

Azimuth and elevation both change by rotating the yoke 214 and the disk 222 about the first axis 230 by different amounts (e.g., rotate the yoke 214 by 20 degrees counterclockwise and rotate the disk 222 by 10 degrees counterclockwise).

Elevation changes and azimuth remains constant by rotating only the disk 222 about the first axis 230. In this manner, the yoke 214 incurs no rotational displacement while the elevation wheel 216 rotates with the disk 222, keeping the azimuth of the payload 212 constant as the elevation changes.

Put in mathematical terms, with the yoke 214 fixed ($\Delta\gamma=0$), rotation of the disk 222 causes a normal vector extending from a surface of the payload 212 (for example, a surface of a mirror) to rotate in elevation only: $\Delta\varepsilon=\Delta\theta \cdot r_r/r_w$ and $\Delta\alpha=0$, where $\Delta\varepsilon$ is the angular displacement of the elevation wheel 216 about the second axis 232, $\Delta\theta$ is the angular displacement of the disk 222, and $\Delta\alpha$ is the angular displacement of the payload 212 about the first axis 230. In the common mode case where the yoke 214 and the disk 222 are rotated by the same angle ($\Delta\gamma=\Delta\theta=0$), the payload surface normal vector rotates only in the azimuthal direction: $\Delta\varepsilon=0$ and $\Delta\alpha=\Delta\gamma$. In the differential mode case where the yoke 214 and the disk 222 both rotate but by different angles, the payload surface normal rotates in both azimuth and elevation: $\Delta\alpha=\Delta\gamma$ and $\Delta\varepsilon=r_r\cdot(\Delta_\gamma-\Delta\theta)/r_w$.

In the equations above, $r_r$ is the radius about the first axis 230 at which the elevation wheel 216 contacts the road 224 and $r_w$ is the radius of the elevation wheel 216 itself. A practical system will typically rotate the yoke 214 and the disk 222 with closed loop electronic control systems that employ feedback from angle-resolving sensors (e.g., encoders) to determine the appropriate current waveforms for the torque motors. If the angular positioning uncertainties for the yoke 214 and the road 224 are $\sigma_\gamma$ and $\sigma_\theta$, respectively, then the uncertainties of the azimuth and elevation angles of the normal vector from a surface of the payload are $\sigma_\alpha=\sigma_\gamma$ and $$\sigma_\varepsilon = \frac{r_r}{r_w}\sqrt{\sigma_\gamma^2 + \sigma_\theta^2},$$

respectively. In the case where the control system angular uncertainties are equal ($\sigma_\theta=\sigma_\gamma$) and the ratio of the wheel and road radii is $$\frac{r_w}{r_r} = \sqrt{2},$$

then $\sigma_\alpha=\sigma_\varepsilon=\sigma_\gamma=\sigma_\theta$.

As long as the elevation wheel 216 does not slip as it rolls on the road 224, the angular orientation of the payload 212 is precisely determined by the rotation of the road 224 and the yoke 214, both of which are directly sensed by angle encoders in the road drive assembly 290 and the yoke drive assembly 292. To assure the lack of slippage, the preload force applied by the road 224 (maintained by the flexure spring 226) is sufficient to maintain enough frictional torque to exceed the maximum torque that is applied by motion of the motors during acceleration of the assembly. Various material choices and tribology can be implemented. For example, the elevation wheel 216 can be equipped with a tire (for example, a rubber O-ring) capable of maintaining high friction when operated within certain temperature ranges. In another example, 440C alloy stainless steel (as annealed) can be used for the road 224 and hard anodized aluminum alloy 6061-T6 provides a high friction contact that eliminates undesired slippage.

In some embodiments, the top assembly 210 includes at least one idler wheel 220 coupled to the yoke 214 and configured to be in contact with the road 224. For example, in some embodiments two idler wheels 220 are each located on the yoke 214 opposite the elevation wheel 216 (only one is shown in FIGS. 2A-D). The idler wheel(s) 220 passively ride on the road 224, which provides stability to the elevation wheel 216 for maintaining constant contact with the road 224 during motion.

In some embodiments, the disk 222 includes an integral flexure spring 226 configured to bias the disk against the elevation wheel 216 and/or the idler wheel(s) 220 for maintaining constant contact between the elevation wheel 216 and the disk 222 during motion.

In some embodiments, the top assembly 210 includes a counterweight 218 coupled to the yoke 214 opposite the elevation wheel 216. The counterweight 218 provides stability to the top assembly 210 during motion of various components, such as the yoke 214, the elevation wheel 216, and the payload 212.

Figure 3:
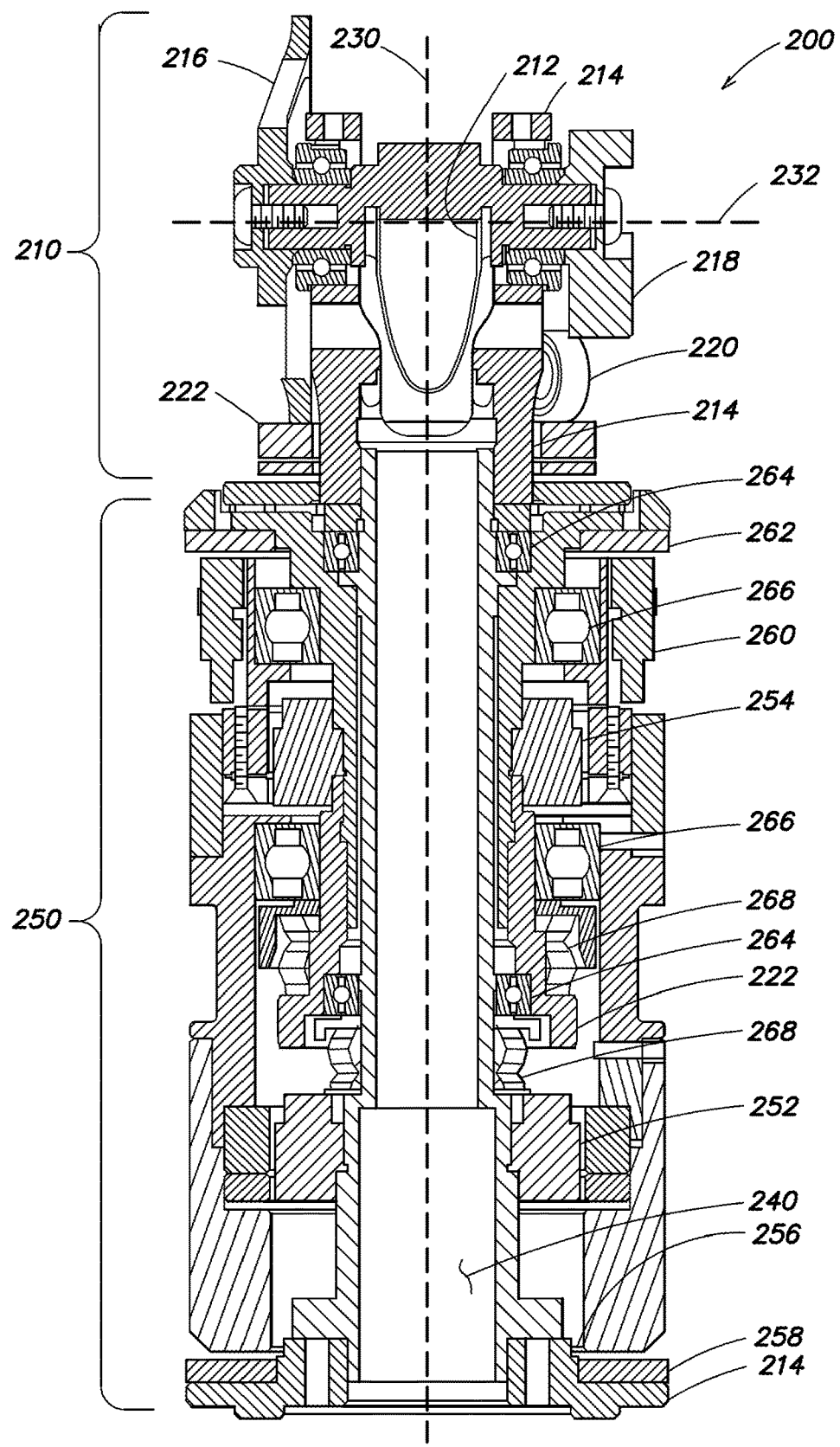
FIG. 3 is a side cross-sectional view of the actuator of FIGS. 2A-2D, in accordance with an embodiment of the present disclosure.

FIG. 3 is a side cross-sectional view of the actuator 200 of FIGS. 2A-2D, in accordance with an embodiment of the present disclosure. The base assembly 250 is rotatably coupled to the top assembly 210, which includes the yoke 214 and the disk 222. The base assembly 250 includes a first open bore torque motor 252 configured to rotate the yoke 214 about the first axis 230, and a second open bore torque motor 254 configured to rotate the disk 222 about the first axis independently of the yoke 214. The open bore design of the first and second torque motors 252, 254 permits an axial bore 240, or yoke tube, to extend entirely through the base assembly 250 along the first axis 230 and through an opening of the disk 222. The axial bore 240 permits light, such as from a laser or other light source, to enter at the bottom of the base assembly 250 and travel up to the payload 212 uninterrupted while the yoke 214 and the disk 222 are in any rotational position and, correspondingly, while the payload 212 is positioned at any azimuth or elevation, such as described with respect to FIGS. 2A-D.

In some embodiments, the base assembly 250 further includes a first encoder sensor 256 and first angle encoder scale 258 (reference point) configured to provide first position information to first open bore torque motor 252, and a second encoder sensor 260 and second angle encoder scale 262 (reference point) configured to provide second position information to the second open bore torque motor 254. The first encoder sensor 256 and the second encoder sensor 260 are both fixedly attached to the base assembly 250. The first angle encoder scale 258 is attached to the yoke 214 and thus rotates with the yoke 214.

The first encoder sensor 256 is configured to detect the position of the first angle encoder scale 258, which represents the rotational position of the yoke 214 with respect to the base assembly 250. The detected position of the first angle encoder scale 258 is used control the first torque motor 252 for precisely positioning the yoke 214, thus controlling the azimuth and/or the elevation of the payload 212, such as described with respect to FIGS. 2A-D. The second angle encoder scale 262 is attached to the disk 222 and thus rotates with the disk 222. The second encoder sensor 260 is configured to detect the position of the second angle encoder scale 262, which represents the rotational position of the disk 222 with respect to the base assembly 250, such as described with respect to FIGS. 2A-D. The detected position of the second angle encoder scale 262 is used control the second torque motor 254 for precisely positioning the disk 222, thus controlling the elevation of the payload 212 with respect to the base assembly 250, such as described with respect to FIGS. 2A-D. Note that rotation of the disk 222 has no effect on azimuth, which is a function of the rotational position of the yoke 214.

In some embodiments, the base assembly 250 further includes one or more yoke spindle bearings 264 and one or more disk spindle bearings 266. The bearings 264, 266 facilitate smooth and even rotational movement of the adjacent components. In some embodiments, the base assembly 250 includes one or more bearing preload springs 268. The springs 268 apply a load against the bearings 264, 266 to further facilitate smooth and even rotational movement of the adjacent components.

Multi-Axis Rotary Actuator with Coudé Path

Figure 4A:
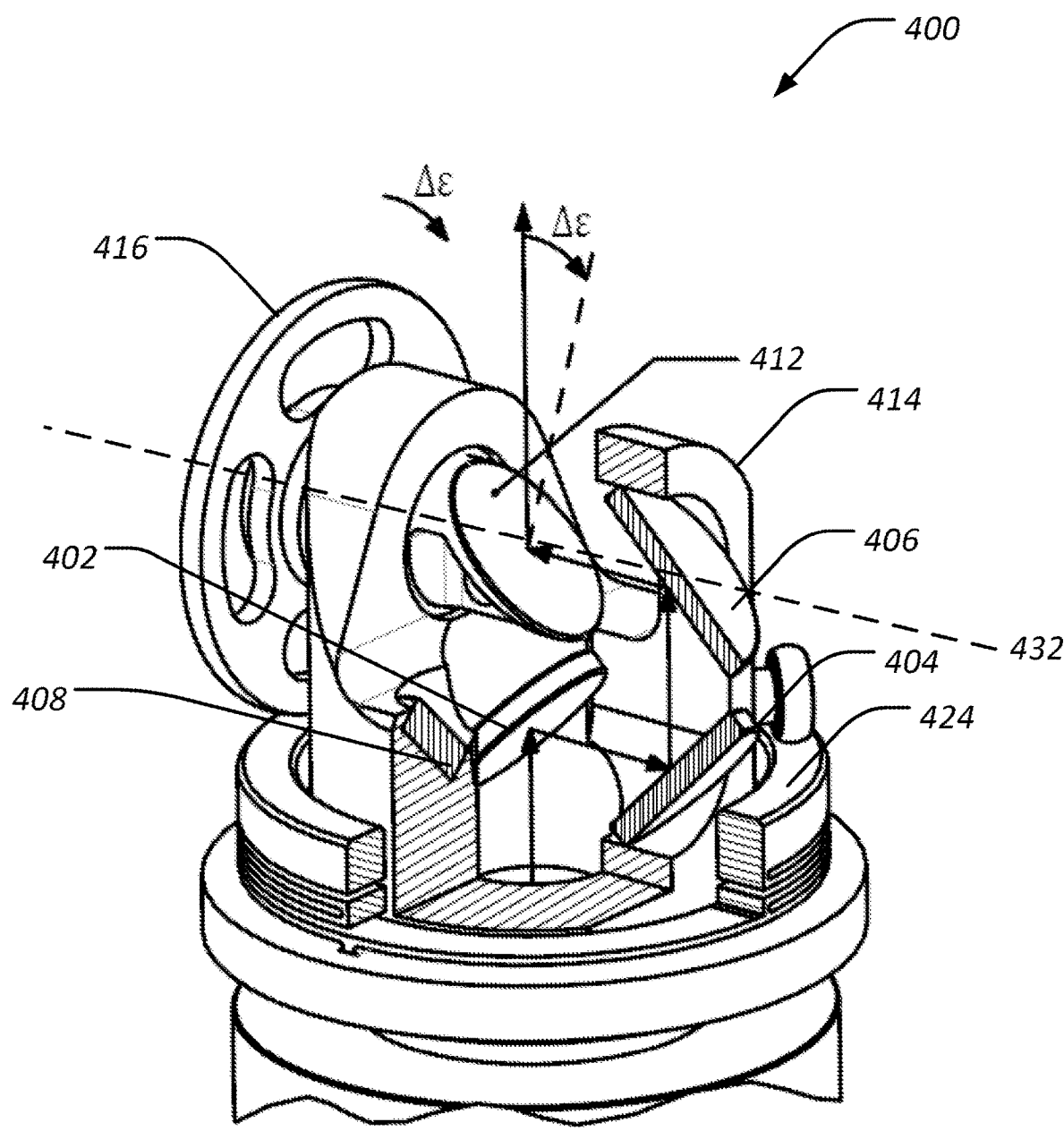
FIGS. 4A and 4B are partial perspective views of an example multi-axis rotary actuator, in accordance with an embodiment of the present disclosure.
Figure 4B:
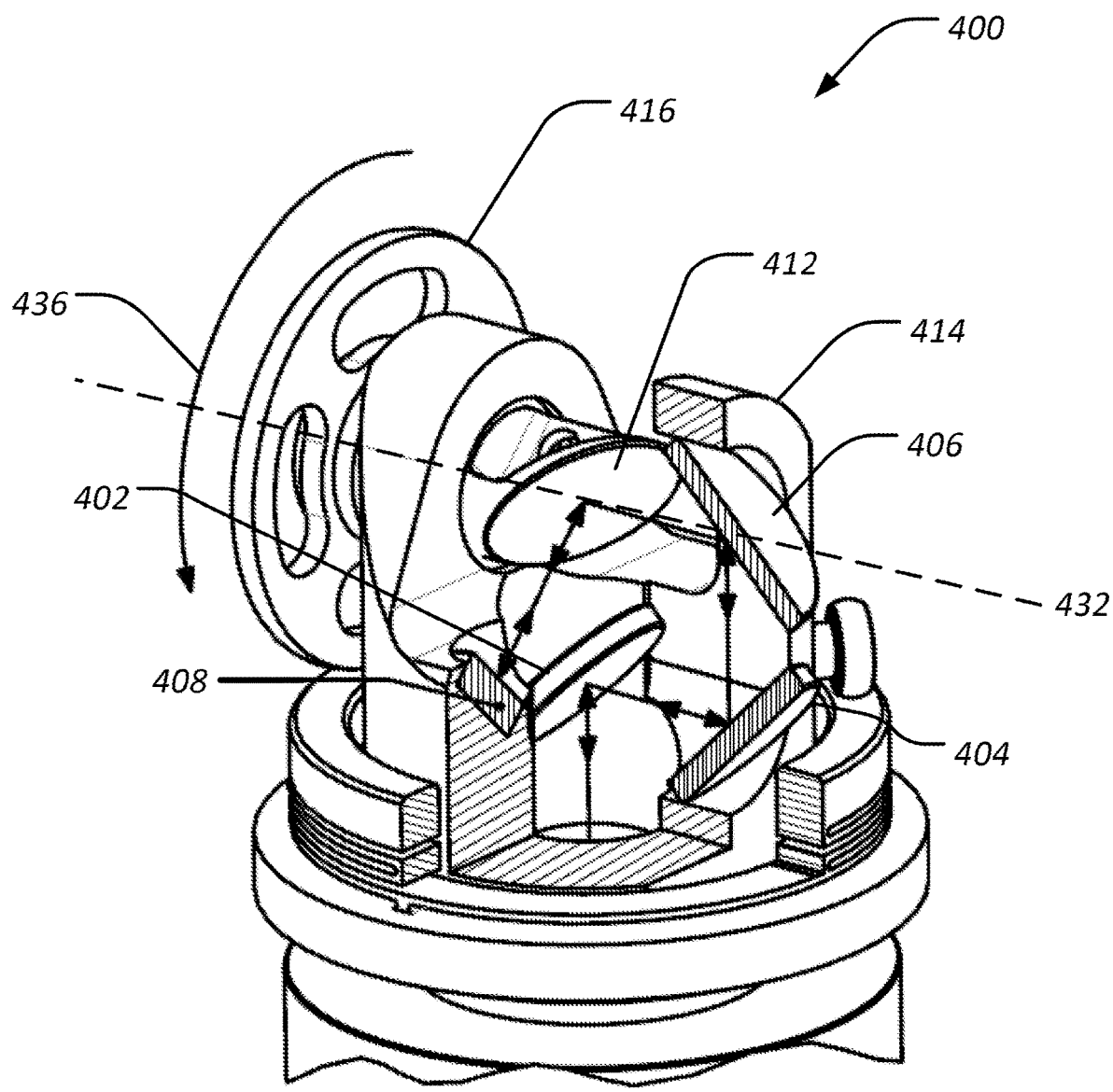

FIGS. 4A and 4B are partial perspective views of another example multi-axis rotary pointer 400, in accordance with an embodiment of the present disclosure. The pointer 400 is similar to the actuators 100 and 200 except that in this example the differential drive mechanism (not shown) is coupled with an optical scanning arrangement sometimes referred to as a coelostat. In further detail, the pointer 400 includes three auxiliary mirrors 402, 404, and 406, which are rigidly attached to a payload support 414 to form an optical arrangement referred to as a Coudé path, which is represented by the arrows between the mirrors 402, 404, 406. The auxiliary mirrors 402, 404, 406 work in conjunction with an output mirror 412 to direct light out of the pointer 400. A fourth (alignment) mirror 408 is rigidly attached to the payload support 414 to establish a fixed reference angle for rotation 436 about an elevation wheel axis 432. The coelostat Coudé arrangement eliminates the 2:1 relationship between changes in the elevation angle of the optical path and changes in the output mirror elevation angle $\sigma_e$ such as shown in FIG. 1. The coelostat Coudé arrangement allows the optical axis to pass through the zenith (elevation angle=90°). The major axis width of all four mirrors in the Coudé optical path is $\sqrt{2}$ times the minor axis width since all reflections occur with a 45° angle in the local plane of incidence. The alignment mirror 408 allows slippage between the wheel 416 and the road 424 to be detected and measured to enable re-zeroing during use. Specifically, retroreflection from the alignment mirror 408 will occur with high repeatability for a fixed elevation rotation angle $\varepsilon_{ref}$, allowing the slippage angle to be determined $$\theta_{slip} = \gamma + \frac{r_r}{r_w}\varepsilon_{ref}.$$

Each of the disclosed embodiments offer several advantages that are useful for applications requiring a very compact design. For example, each of the multi-axis rotary actuators 100, 200, 400 avoids the use of complicated, hard to source miniature slip rings or twist flex capsules required to pass electrical connections to the motor and encoder in a conventional elevation over azimuth design. The disclosed designs maximize clear aperture by avoiding the need to place a torque motor, an angle sensor, and electrical linkage components on the moving azimuth assembly and thereby reduce the potential size of the output mirror. The disclosed designs permit continuous 360° rotation about the azimuth axis. The disclosed designs eliminate the need to place a torque motor directly on the elevation assembly, reducing the load (moment of inertia) applied to the azimuth torque motor, and, therefore, the torque required from the azimuth motor. The disclosed designs permits the use of comparatively large torque motors for both axes. Otherwise, an ultra-miniature torque motor would be required for the elevation axis. Such an ultra-miniature torque motor is both difficult to source and has a limited torque capacity. Furthermore, the disclosed designs permit the use of comparatively large angle encoders for both axes of rotation.

Additional Examples

Numerous embodiments will be apparent in light of the present disclosure, and features described herein can be combined in any number of configurations.

Example 1 provides a multi-axis rotary actuator including a payload support configured to be rotatable about a first axis; a disk surrounding at least a portion of the payload support, the disk configured to be rotatable about the first axis independently of the payload support; and an elevation wheel rotatably coupled to the payload support, the elevation wheel configured to be in contact with the disk and to be rotatable about a second axis perpendicular to the first axis as a function of the differential angular rotations of the payload support and the disk.

Example 2 includes the subject matter of Example 1, further including a mirror coupled to the elevation wheel and configured to be rotatable about the first axis and the second axis as the payload support and the elevation wheel rotate about the first axis and the second axis, respectively.

Example 3 includes the subject matter of any of Examples 1-2, further including at least one idler wheel coupled to the payload support and configured to be in contact with the disk.

Example 4 includes the subject matter of Example 3, where the disk includes an integral flexure spring configured to bias the disk against the at least one idler wheel.

Example 5 includes the subject matter of any of Examples 1-4, further including a counterweight coupled to the elevation wheel or to the payload support.

Example 6 includes the subject matter of any of Examples 1-5, further including a base assembly rotatably coupled to the payload support and the disk, the base assembly including: a first open bore torque motor configured to rotate the payload support about the first axis; and a second open bore torque motor configured to rotate the disk about the first axis independently of the payload support.

Example 7 includes the subject matter of Example 6, further including: a first encoder sensor configured to provide first position information to first open bore torque motor; and a second encoder sensor configured to provide second position information to the second open bore torque motor.

Example 8 includes the subject matter of any of Examples 1-7, where the disk includes at least one of a ceramic material, anodized aluminum, and/or stainless steel.

Example 9 provides a multi-axis rotary actuator including a first assembly having a first torque motor and a first structure; and a second assembly having a second torque motor and a second structure, the first and second torque motors configured to rotate the first structure relative to the second structure.

Example 10 includes the subject matter of Example 9, where the first structure includes a payload support and the second structure includes a disk, and where: the first torque motor is configured to rotate the payload support about a first axis; and the second torque motor is configured to rotate the disk about the first axis independently of the payload support.

Example 11 includes the subject matter of Example 10, further including a first encoder sensor configured to provide first position information to first torque motor; and a second encoder sensor configured to provide second position information to the second torque motor.

Example 12 includes the subject matter of any of Examples 9-11, where the first assembly includes a payload support configured to be rotatable about a first axis by the first torque motor, where the second assembly includes a disk surrounding at least a portion of the payload support, the disk configured to be rotatable about the first axis by the second torque motor, and where the first assembly further includes an elevation wheel rotatably coupled to the payload support, the elevation wheel configured to be in contact with the disk and to be rotatable about a second axis perpendicular to the first axis.

Example 13 includes the subject matter of Example 12, where the first assembly further includes a mirror coupled to the elevation wheel and configured to be rotatable about the first axis and the second axis as the payload support and the elevation wheel rotate about the first axis and the second axis, respectively.

Example 14 includes the subject matter of any of Examples 12-13, further including at least one idler wheel coupled to the payload support and configured to be in contact with the disk.

Example 15 includes the subject matter of any of Examples 12-14, where the disk includes an integral flexure spring configured to bias the disk against the at least one idler wheel.

Example 16 includes the subject matter of any of Examples 12-15, further including a counterweight coupled to the payload support.

Example 17 provides a method of controlling a multi-axis rotary actuator, the actuator including a first assembly having a first torque motor and a first structure, and a second assembly having a second torque motor and a second structure, the method including: causing at least one of the first torque motor and the second torque motor to rotate, thereby causing the first structure to rotate relative to the second structure.

Example 18 includes the subject matter of Example 17, where the first assembly includes a payload support and the second assembly includes a disk, and where the method further includes: causing the first torque motor to rotate the payload support about a first axis; and causing the second torque motor to rotate the disk about the first axis independently of the payload support.

Example 19 includes the subject matter of any of Examples 17-18, further including providing first position information to first torque motor using a first encoder sensor; and providing second position information to the second torque motor using a second encoder sensor.

Example 20 includes the subject matter of any of Examples 17-19, further including causing the first torque motor and the second torque motor to each rotate by a same amount of displacement.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A multi-axis rotary actuator, comprising:
    a payload support configured to be rotatable about a first axis;
    a disk surrounding at least a portion of the payload support, the disk configured to be rotatable about the first axis independently of the payload support; and
    an elevation wheel rotatably coupled to the payload support, the elevation wheel configured to be in contact with the disk and to be rotatable about a second axis perpendicular to the first axis as a function of the differential angular rotations of the payload support and the disk.

2. The actuator of claim 1, further comprising a mirror coupled to the elevation wheel and configured to be rotatable about the first axis and the second axis as the payload support and the elevation wheel rotate about the first axis and the second axis, respectively.

3. The actuator of claim 1, further comprising at least one idler wheel coupled to the payload support and configured to be in contact with the disk.

4. The actuator of claim 3, wherein the disk includes an integral flexure spring configured to bias the disk against the at least one idler wheel.

5. The actuator of claim 1, further comprising a counterweight coupled to the elevation wheel or to the payload support.

6. The actuator of claim 1, further comprising a base assembly rotatably coupled to the payload support and the disk, the base assembly comprising:
    a first open bore torque motor configured to rotate the payload support about the first axis; and
    a second open bore torque motor configured to rotate the disk about the first axis independently of the payload support.

7. The actuator of claim 6, further comprising:
    a first encoder sensor configured to provide first position information to first open bore torque motor; and
    a second encoder sensor configured to provide second position information to the second open bore torque motor.

8. The actuator of claim 1, wherein the disk includes at least one of a ceramic material, anodized aluminum, and/or stainless steel.

* * * * *